United States Patent
Brulle-Drews

(10) Patent No.: US 7,406,382 B2
(45) Date of Patent: Jul. 29, 2008

(54) SYSTEM FOR DETERMINING WEATHER INFORMATION AND PROVIDING AMBIENT PARAMETER DATA

(75) Inventor: Christian Brulle-Drews, Hamburg (DE)

(73) Assignee: Harman/Becker Automotive Systems GmbH, Karlsbad (DE)

( * ) Notice: Subject to any disclaimer, the term of this patent is extended or adjusted under 35 U.S.C. 154(b) by 63 days.

(21) Appl. No.: 11/061,859

(22) Filed: Feb. 18, 2005

(65) Prior Publication Data

US 2005/0187714 A1 Aug. 25, 2005

(30) Foreign Application Priority Data

Feb. 20, 2004 (EP) .................................. 04003872

(51) Int. Cl.
G01W 1/00 (2006.01)
(52) U.S. Cl. ......................................................... 702/3
(58) Field of Classification Search ................. 702/2–5; 342/26 R–26 D; 340/601, 539.13, 539.17, 340/539.2, 628
See application file for complete search history.

(56) References Cited

U.S. PATENT DOCUMENTS

| | | | | |
|---|---|---|---|---|
| 5,699,056 A * | 12/1997 | Yoshida | ....................... | 340/905 |
| 5,876,110 A * | 3/1999 | Uke | ............................. | 362/184 |
| 6,167,255 A * | 12/2000 | Kennedy et al. | ......... | 455/414.1 |
| 6,177,873 B1 * | 1/2001 | Cragun | ....................... | 340/601 |
| 6,360,172 B1 * | 3/2002 | Burfeind et al. | ................. | 702/2 |
| 6,429,812 B1 * | 8/2002 | Hoffberg | .................. | 342/357.1 |
| 6,501,392 B2 | 12/2002 | Gremmert et al. | | |
| 6,560,456 B1 * | 5/2003 | Lohtia et al. | ................. | 455/445 |
| 6,590,529 B2 * | 7/2003 | Schwoegler | ........... | 342/357.13 |
| 6,611,687 B1 * | 8/2003 | Clark et al. | ............... | 455/456.5 |
| 6,845,324 B2 * | 1/2005 | Smith | ........................... | 702/3 |
| 6,911,906 B2 * | 6/2005 | Satou | .......................... | 340/500 |
| 6,919,821 B1 * | 7/2005 | Smith | ........................ | 340/905 |
| 6,982,635 B2 * | 1/2006 | Obradovich | ................. | 340/439 |
| 2002/0138197 A1 * | 9/2002 | Schramke et al. | ........... | 701/213 |
| 2002/0143469 A1 * | 10/2002 | Alexander et al. | ............. | 702/2 |
| 2002/0188522 A1 * | 12/2002 | McCall et al. | ................. | 705/26 |
| 2003/0212494 A1 * | 11/2003 | Alexander et al. | ............. | 702/5 |
| 2004/0036601 A1 * | 2/2004 | Obradovich | ................. | 340/540 |
| 2005/0014486 A1 * | 1/2005 | Shimizu et al. | .......... | 455/412.1 |

FOREIGN PATENT DOCUMENTS

DE 197 00 353 A1 7/1998

OTHER PUBLICATIONS

European Search Report dated Jun. 30, 2004 for EP Application No. EP 04 00 3872.

* cited by examiner

Primary Examiner—Donald E McElheny, Jr.
(74) Attorney, Agent, or Firm—Brinks Hofer Gilson & Lione

(57) ABSTRACT

A system that collects parametric information that reflects local weather conditions receives signals from sensors. The signals are transmitted to a server that combines the information contained within the signals with weather data to determine local weather conditions and develop forecasts. The local weather conditions and forecasts may be transmitted to a vehicle and may be combined with navigation information to optimize travel routes.

36 Claims, 5 Drawing Sheets

SYSTEM FOR DETERMINING WEATHER INFORMATION AND PROVIDING AMBIENT PARAMETER DATA

PRIORITY CLAIM

This application claims the benefit of European Patent Application No. 04003872.1, filed on Feb. 20, 2004. The disclosure of the above application is incorporated herein by reference.

BACKGROUND OF THE INVENTION

1. Technical Field

This application relates to a system that reports weather conditions, in particular, a system that reports weather conditions to an operator of a vehicle.

2. Related Art

Weather information and forecasts for wide regional areas are broadcasted for pubic use. The weather information may be transmitted on traffic message channels (TMC). Some vehicles may have TMCs. The weather information may be stored in a TMC receiver, and made available to the operator of the vehicle at the operator's convenience. The system may display or audibly transmit the weather information.

Because broadcasted weather information is regional, the weather may vary considerably throughout the region. Further, the weather conditions and forecasts may not be updated on a consistent basis. Therefore, a driver using this information may change plans or routes unnecessarily. Thus, there is a need to provide local weather forecasts.

SUMMARY

A system collects parametric information that is indicative of the local weather conditions. The system may include a receiver that receives an ambient parametric value from a sensor connected to a vehicle. The system may include an initiator that initiates the transmission of the ambient value to an external server. The system may receive localized data from the external server. The data may include local weather conditions and forecasts.

A method detects and reports weather information that may include reports on current weather conditions and forecasts for a local area. The method may receive an ambient value from a sensor located on a vehicle. The method may correlate the position of the ambient value to a position of the vehicle. The method may transmit the value and position to an external server that determines weather information for the local position of the vehicle where the ambient value was measured. The method may receive local weather conditions and forecasts from the server. The method may use the local weather information to calculate and determine an optimized route of travel between a point of origin and a destination.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Some vehicles are equipped with sensors that measure ambient conditions such as temperature, background light, and the occurrence of precipitation. The values of these conditions or parameters may be presented to an operator of the vehicle or used to control specific devices such as windshield wipers or headlights. Other sensors detecting ambient conditions may provide data that informs the driver about the possibility of black ice or slippery road conditions. The data may be transmitted to an external server that may process the data to determine local road conditions. An "external server" may be used outside the vehicle, such as a server at a weather or meteorological station. However, where the vehicle is a ship, the ship may be capable of determining local meteorological conditions and forecasts since the ship may be in communication with weather satellites. The sensor information correlated with a vehicle position may be combined with the regional weather information at the server. When the combined weather information is transmitted to the vehicle, a vehicle operator may be provided with a local view of weather conditions along a travel route. Where the information is received from many vehicles throughout a region, the server has much more detailed weather information for various local areas. The weather information and conditions for the local areas may be made available to any vehicle operator planning to travel through the region. Further, the detailed weather conditions and forecasts may be taken into consideration when a travel route between a point of origin and a destination is calculated.

Figure 1:
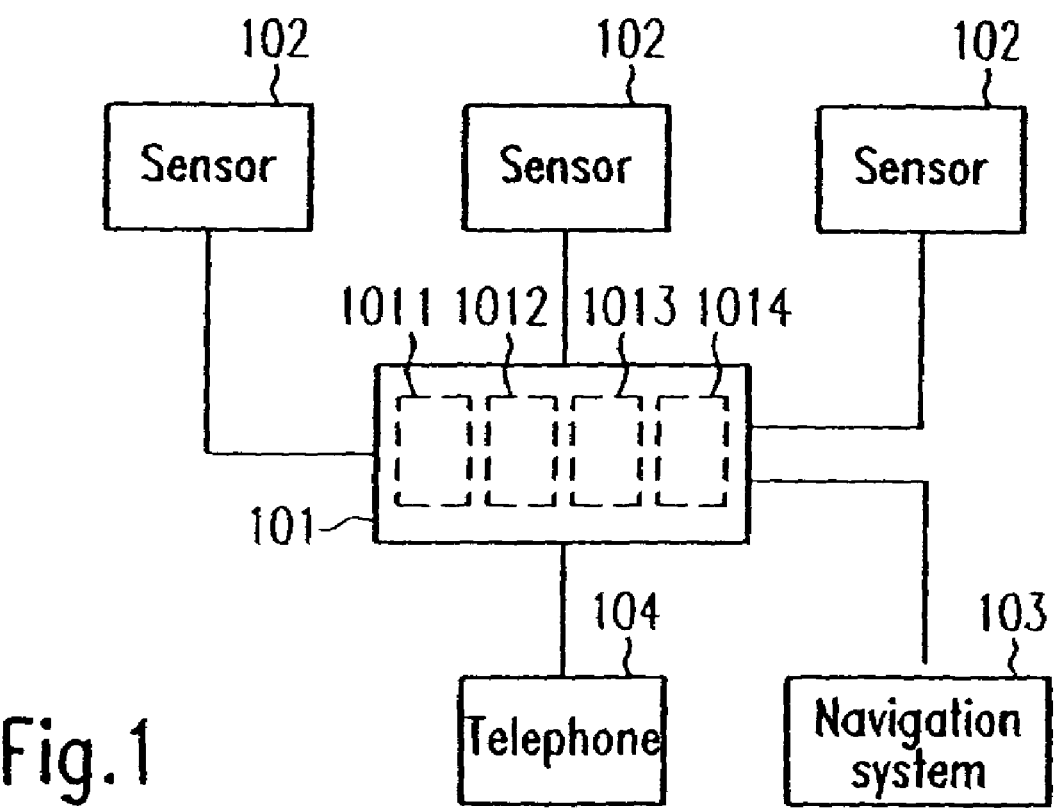
FIG. 1 is a block diagram of a weather information system.

FIG. 1 is a block diagram of a control system 101 that may be connected to a vehicle for measuring ambient conditions or parameters surrounding the immediate area of the vehicle. The control system 101 may measure ambient parameters for determining precise and up-to-date local weather information. The parameters may be obtained from several corresponding sensors 102 that are connected to the control system 101. Depending on the type of vehicle, for instance a car, a ship, a plane, or a train, different types of sensors 102 may be provided. The control system may connect to a navigation system 103 for obtaining the position of the vehicle. The control system may connect to a telephone 104. The connection to the telephone 104 may be a wireless connection.

The control system may include a triggering device 1013 to trigger a sensor 102 to transmit the current value of the associated parameter. A receiver 1011 that receives the value from the sensor may be included in the control system 101. A memory 1014 in the control system 102 may store the parametric value from the sensor 102. An initiating unit 1012 may be included within the control system to initiate transmission of the parametric values from the telephone 104 to an outside server.

The sensors 102 that measure the ambient conditions may be, but are not limited to, a thermometer, a barometer, a precipitation sensor, a brightness sensor, a loss of traction sensor or sensors, a visibility range sensor, a wind sensor, and weather radar units within or on the vehicle. In particular, the sensors 102 may sense temperature, pressure, humidity, precipitation, wind speed, visibility, brightness, fog, low traction, low sunlight, or any other parameter that may influence the driving conditions. The value of the parameter may be a number indicating the value of the parameter or a logic value such as that found in a digital system.

The triggering device 1013 in the control system 101 sends a triggering signal to the sensor 102. The triggering signal may be sent to one or more sensors 102 simultaneously or sequentially. The triggering signal may cause a sensor 102 to measure an associated ambient parameter value. The parameter value may be transmitted directly to the receiver 1011. The triggering device 1013 may be a clock generator configured to provide the triggering signal at regular time intervals. In another variation, the triggering signal may be sent when a location or position of a vehicle is detected. The triggering device 1013 may receive an external triggering signal that triggers the sensors 102.

The receiver 1011 in the control system 101 receives the parameter values from the sensors 102. The receiver also may be configured to receive position data related to the location of the vehicle. The position data correlates the position of the vehicle to a time when a value of the ambient parameter was received. The position data may be provided by a navigation system 103. The receiver 1011 may include any line or wireless receiver capable 30 of receiving electronic signals from the sensor 102 and may communicate the data to a processor within the control system 101.

The control system 101 may include a processor (not shown) or controller for processing data. For example, the parameter data and/or the position data may be processed into a specific format. In particular, the parameter data and the position data may be combined into a single data file that may be transmitted as a complete signal. The processor may be part of the receiver 1011. The processor may include embedded instructions for providing operating instructions to the control system 101 or it may be programmable. The control system 101 may include a memory 1014 for storing the values received from the sensors. The memory 1014 may also store the operating instructions for receiving the sensor data and transmitting the data to an external server.

The control system 101 may include an initiator 1012 that initiates the transmission of the parametric values to an external server. The initiator 1012 may combine the measured values with the position data so that the data is transmitted as one signal. The initiator 1012 also may be configured to transmit in a wireless environment. The initiator 1012 may be a small computer system interface ("SCSI") initiator that commands routines by sending a task to a device. As shown, the initiator 1012 may send the data to the telephone 104, and the telephone 104 may transmit the parametric data from the sensors 102 to an outside server.

Position data may be received from a navigation system 103 connected to the control system 101. The navigation system 103 may be configured to determine the current position of the vehicle from satellite signals such as Global Positioning System ("GPS") signals and may include motion sensors such as a gyroscopes and accelerometers. Upon request, the navigation system 103 may transmit the current position of the vehicle to the receiver 1011. Alternatively, the navigation system 103 may be configured to regularly provide the control system 101 with the position of the vehicle.

A telephone 104 may be connected to the control system 101 to provide communication with an external server (not shown). The connection between the system 101 and the telephone 104 may be wireless. The telephone 104 may be a digital service (e.g. a wireless Personal Communication Service or "PCS") or a cellular telephone that use wireless and/or landline telephone networks. The control system 101 may communicate the parametric values and the position data to the telephone 104. The transmission from the control system 101 to the telephone 104 may include a control signal that commands the telephone 104 to send the parametric values and related position data to an external server. The telephone 104 may be an operator's wireless or mobile phone.

The telephone 104 may be configured to receive data, for example, weather forecast data, from the external server. The data may be forwarded to the control system 101 and/or to the navigation system 103. Either the control system 101 or navigation system 103 may be configured to direct the received signal to an output device (not shown) such as a display or to a text-to-speech device which sends the information to a speaker system so that the user may hear the local weather report. The output device may be integral to the control system 101 or navigation system 103 or may be a unitary part of either system 101 or 103. The output device also may be part of an entertainment system within the vehicle. The weather information may be transmitted directly from the telephone 104 to a corresponding output device without passing through the control system 101.

Figure 2:
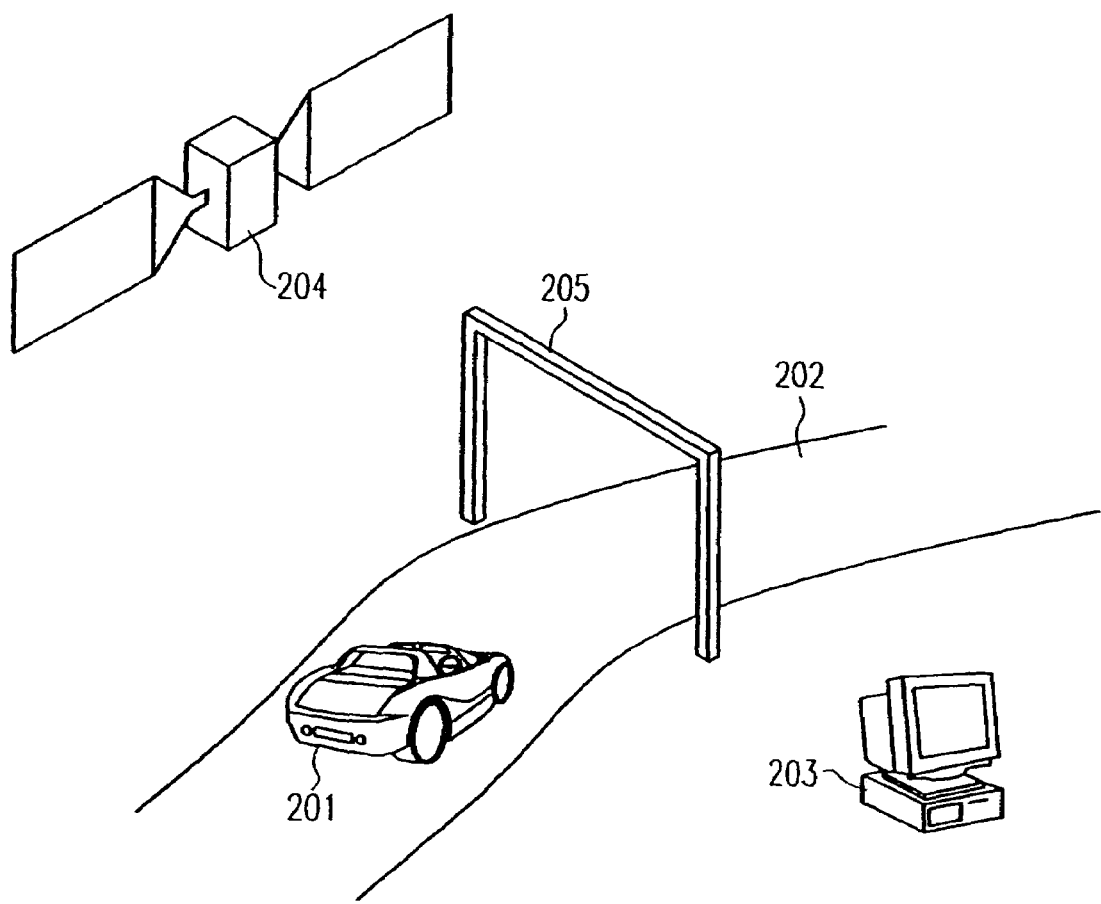
FIG. 2 is a relational diagram of components in a weather information system.

FIG. 2 illustrates the relationship between the various systems that provide input for the weather information. The vehicle 201 is shown as a car traveling along a road 202, but the vehicle 201 may be any device that transports persons or things and may include trucks, buses, recreational vehicles, and boats. The vehicle 201 may be equipped with the control system 101 of FIG. 1. The vehicle 201 may include a navigation system 103 and a telephone 104 for communicating with a server 203. A satellite system 204 may provide GPS to the navigation system 103. A triggering station 205 may be positioned along the road 202 to provide external triggering signals. The triggering station 205 may provide position information that may be correlated with the values received from the sensors 102 on the vehicle 201.

A sensor 102 may determine the value of an ambient parameter by measuring the parameter directly or indirectly. The temperature may be measured directly with a thermometer. A loss of traction may be determined indirectly by utilizing information supplied by wheel speed sensors. Where the desired parameter is a loss of traction, the value may be represented by a "yes" or "no," or the digital equivalent of these values.

Parameter values may be transmitted to the external server 203. The transmission of the values may be accomplished by a mobile phone 104. The external server 203 receiving the parametric values may be located in a meteorological office. The server 203 may include a receiver (not shown) and a transmitter (not shown) for communicating with the telephone 104. Alternatively, the server 203 may connect to a communication system (not shown) that provides communication systems and protocols for communicating with a vehicle's control system 101 and/or telephone 104. The server 203 also may include a processor or controller that processes the ambient parameters and the related position to determine local weather information. The server 203 may be any computer capable of communicating with the control system 101.

The navigation system 103 may receive signals from a satellite 204 to determine the current position of the vehicle 201. A satellite system may provide GPS data to the navigation system 103. Sensors such as accelerometers may be used in the vehicle 201 to increase the accuracy of the position data. Navigation systems 103 may calculate a route based on an origin and a destination. For example, an electronic map in a navigation system 103 may display a preferred route. Weather conditions along certain roadways may be factors that influence the route calculation. The factors may include parameters or conditions that are related to "black ice" or poor visibility from fog or blowing snow. A road having these conditions may receive a penalty value for route calculation. Alternatively, the route calculation may ignore roads having poor travel conditions. The calculation of the route may include a calculation of the estimated travel time incorporating the current weather conditions.

A satellite 204 may provide images in the visible and infrared range representative of regional weather conditions to an external server 203. The external server 203 may process and combine these images with other regional weather data. The images from the satellite 204 may be current or relatively current.

The values of the ambient parameters and the related position data may be transmitted to the external server 203 in reaction to a triggering signal. A clock generator may provide the triggering signal. Alternatively, a triggering signal may issue when a vehicle 201 passes a location. For example, the navigation system 103 in a vehicle may be configured to provide a triggering signal if the vehicle 201 passes a marker. The vehicle 201 may cross a bridge or may approach or pass a position having specific topographic features such as a hilltop, lake, river, or forest.

Alternatively, an external triggering signal may be provided by a triggering station 205. The triggering station may be positioned along a roadside 202 or other path such as a railway or river. The triggering station 205 may have a beacon or serve as a toll station where passing vehicles, which may be registered, receive the triggering signal. Once received, the control system 101 requests the sensors 102 to measure a parameter and transmit the value to the receiver 1011.

Where triggering stations 205 are used, it may not be necessary to equip a vehicle 201 with a navigation system 103. If a vehicle 201 passes a triggering station 205, the vehicle may be detected. The triggering signal of the station 205 may cause the sensor 102 to transmit a value to the control system 101 which may transmit the value to the triggering station 205. From this station 205, the value may be further transmitted to an external server 203 with an identifier of the triggering station 205. The server 203 will recognize the position of the triggering station 205 from the identifier.

Multiple triggering stations 205 may be located along the path 202 traveled by the vehicle 201. The triggering stations 205 may be placed at predetermined distances from one another or at predetermined positions along the road 202. Some of the triggering stations 205 may have a data receiving station. When the vehicle 201 passes by the triggering station 205, the sensors 102 may be triggered either directly or by the control system 101. In response, the sensors 102 measure the associated parameters and transmit the values to the control system 101. If a particular triggering station 205 does not have a receiver, then the values may be stored in the memory 1014. When the vehicle 201 passes a triggering station 205 that has a receiver, the values may be transmitted to the triggering station 205. The values may be correlated to the positions of the triggering stations 205. The corresponding data pairs (consisting of a parameter value and a corresponding position) may be transmitted to an external server 203.

The server 203 may use the values from the vehicle 201 to realize the current weather conditions and to forecast impending and longer term weather. Measured values received from vehicles 201 in various locations may be combined with data from meteorological stations, including Doppler radar stations and satellite signals. The server 203 may process the associated data forming local weather conditions and forecasts. The server 203 may transmit the weather conditions and forecasts to vehicles 201 either upon request or automatically. Vehicles 201 receiving the weather information and the vehicles 201 sending the ambient values may be different vehicles. Vehicles 201 that are just beginning a trip may take advantage of existing weather information that results from the data sent by other vehicles 201 passing through the local areas. Vehicle operators may request information on any region or local area of interest. The request may include the current position of the requesting vehicle. The position data may be used to identify the region for which weather information is desired.

Values may be collected for ambient parameters that were measured by sensors 102 integrated within a vehicle. The parametric values may be transmitted to a server 203 where the values are processed, thus determining weather information for a corresponding region or local area. The resulting weather information may include current weather conditions for the local areas and accurate forecast information based on the ambient parametric values received from vehicles passing through the particular regions or areas. If multiple vehicles provide ambient parametric data, a large amount of data may be supplied from different regions, regularly updating the server 203 to provide accurate, local weather information.

Figure 3:
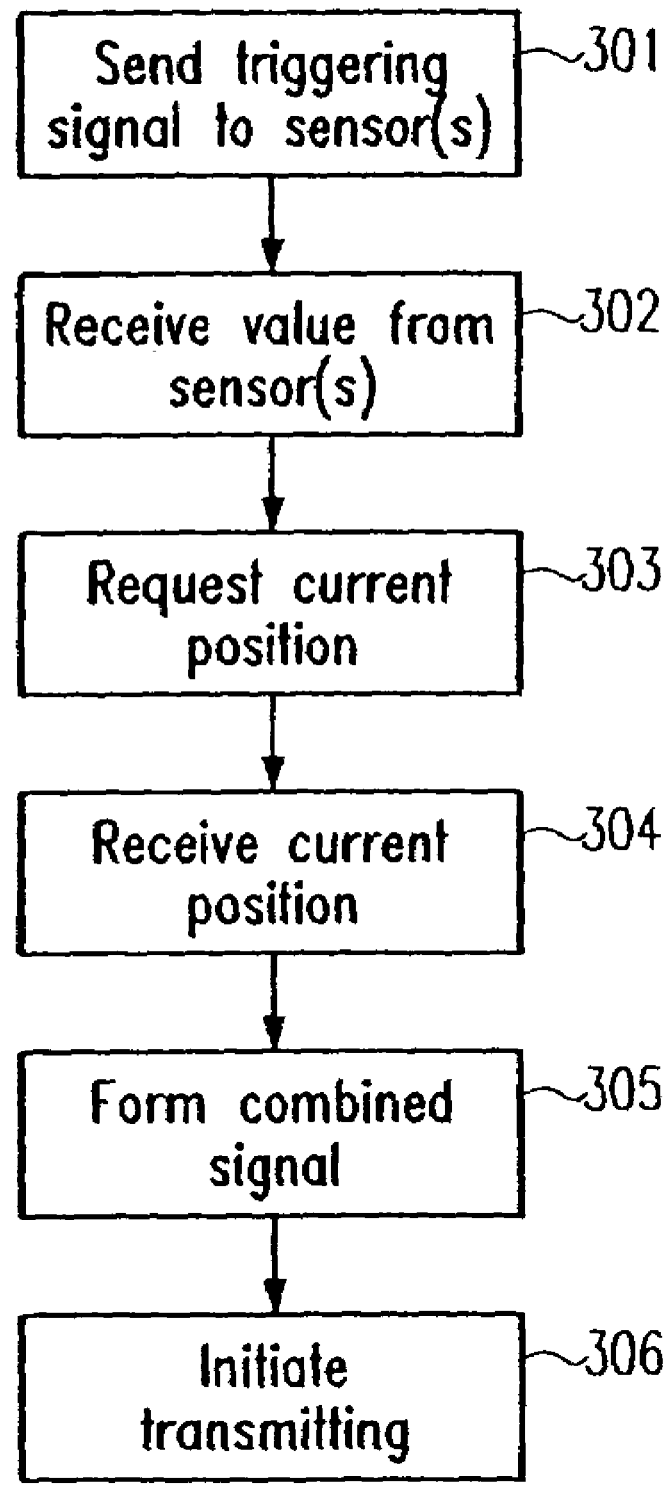
FIG. 3 is an exemplary flow diagram for receiving ambient conditions.

FIG. 3 is a flow diagram illustrating the collection of ambient parametric data A triggering signal may be sent to one or several sensors on a vehicle (act 301). The triggering signal may originate from a triggering unit 1013 in a control system 101. The control system 101 may be an integral unit or a unitary part of the vehicle 201. The triggering signal may be sent in different ways. For example, the triggering device 1013 may be a clocking device that sends a triggering signal at predetermined time intervals. Alternatively, or additionally, an external device may cause the control system 101 to generate a triggering signal.

Sensors 102 that receive a triggering signal measure an associated parameter or ambient condition that may include temperature, pressure, wind, precipitation, or a loss of traction. In the case of a motor vehicle 201, the loss of traction sensor may be part of a system mounted in the motor vehicle for preventing the loss of traction such as an electronic stability program (ESP) or system.

A receiver 1011 in the control system 101 may receive the value from the sensor 102 (act 302). When the value is received, the current position of the vehicle 201 may be requested (act 303). The position data may correlate the position where the value from the sensor 102 was measured. The correlation may be achieved by sending a corresponding signal to a navigation system 103 in the vehicle 201. The navigation system 103 may determine the current position of the vehicle 201 from satellite data and/or motion sensors attached to the vehicle 201.

The position data is received by the control system 101 (act 304). The values received from the sensors 102 and the position data may be joined to form a combined signal (act 305). An initiator 1012 may initiate the transmission of the signal (act 306). The initiator 1012 may send the data to a telephone 104 connected to the control system 101 together with the identification of the server 203. The identification of the server may be a telephone number. The transmitted signal may be the combined signal or it may be the value from the sensor 102 and the position data transmitted separately. The sensor data and the position data may also be sent separately at different times. The values may still be correlated to the position so that the server 203 determines the corresponding weather conditions and develops the weather forecasts.

Figure 4:
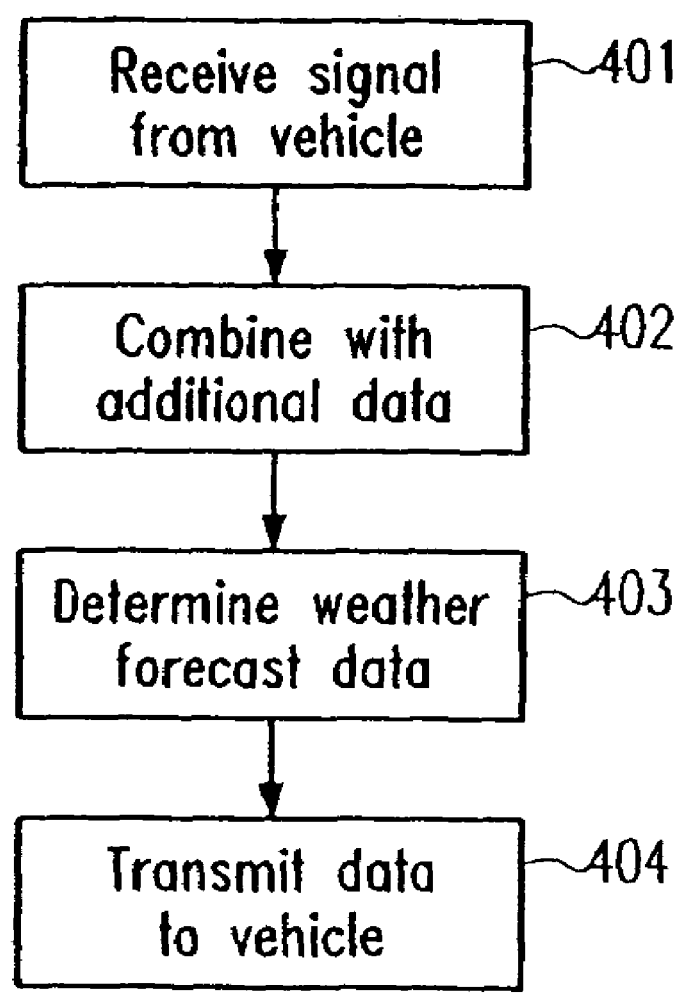
FIG. 4 is an exemplary flow diagram for determining weather information.

FIG. 4 is a flow diagram that determines weather information by a server 203. The server 203 receives a signal from at least one vehicle 201 (act 401). The signal may include ambient values from one or multiple sensors 102. The signal may include the position data for the vehicle 201. In particular, the combined data in this signal may be formatted for processing by the server 203. If not, the server 203 may reformat the data to a suitable form. The server 203 may be located in a meteorological office and configured to process weather data. In particular, the server 203 may develop a weather forecast and provide the weather conditions and the forecasts to a user. The server 203 may include one or several data processing units and data storage units to carry out the required functions.

The ambient values received from one or several vehicles 201 may be combined with data obtained from meteorological stations and/or weather satellites (act 402). The act of combining the ambient values with meteorological data is optional and the processing of the ambient values by the server 203 may occur without considering additional data The combination of the ambient values from vehicles 201 and data from meteorological stations and/or satellites may develop a weather forecast for a local area (act 403). The weather forecast may include expected temperature, precipitation, road, and visibility conditions. The weather forecast may be transmitted to a vehicle 201 (act 404). A transmission may be performed at the request of the vehicle 201 or it may be transmitted automatically. The forecast may cover local areas outside of the area where the vehicle is traveling. Thus, a vehicle 201 may request the weather forecast for a specific area which may include a travel route. For example, if a vehicle operator wishes to know the forecast in a specific area, a corresponding request may be sent from the vehicle 210 to the external server 203. The external server 203 may respond with the desired information. The information may include a weather forecast and current, up-to-date weather information and travel conditions.

Figure 5:
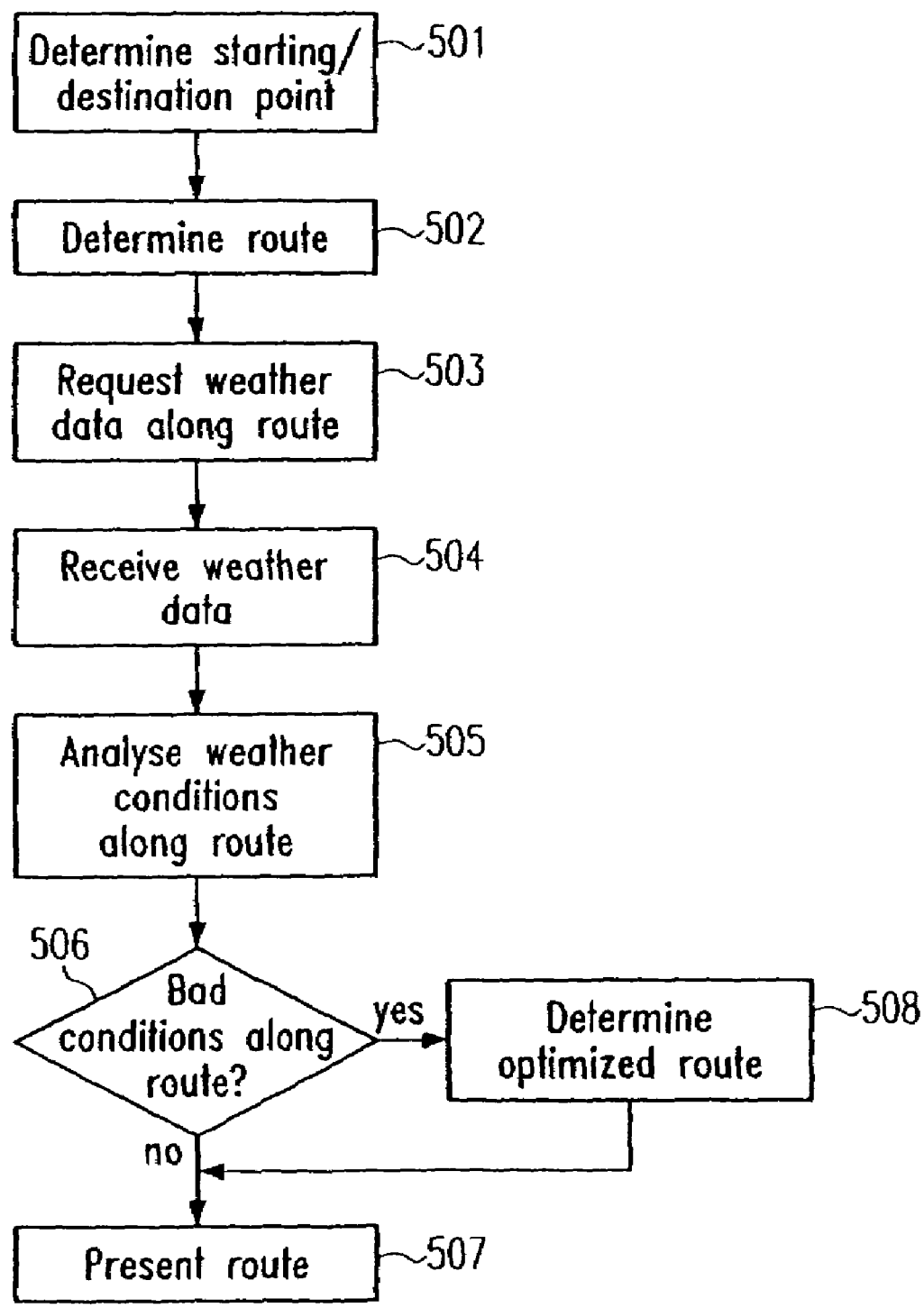
FIG. 5 is an exemplary flow diagram for determining a route.

FIG. 5 is flow diagram for calculating a travel route. Navigation systems 103 may calculate the shortest route between an origin and a destination based on electronic road maps available to the navigation system 103. In such a system 103, the origination and the destination may be entered (act 501). The origin may be entered by the system 103 requesting the user to select the origin from a corresponding list of cities. The destination may be selected similarly. The user may enter the origin and destination on an input device such as a keyboard. Alternatively, the starting point may be the current position of the vehicle that is obtained from GPS satellite data.

A route may be calculated by the navigation system 103 using one or several electronic road maps (act 502). The road map may be stored in a memory of a navigation system 103 or obtained from a CD or DVD that has current road map data for a specific region. The route may be calculated using different criteria and constraints such as the shortest route or most scenic route.

The weather data for regions along the calculated route may be requested by the control system 101 (act 503). The request is made to a corresponding external server 203. In the request, the regions for which weather data (current data and/or forecast data) is desired may be specified by transmitting coordinates of the route or the names of large cities along the route. The weather data and road conditions will be transmitted in reply to the vehicle request (act 504). The navigation system 103 may analyze the calculated route for unsafe conditions such as reduced visibility or slippery road conditions (act 505). These conditions may be identified by the control system 101 or navigation system 103 as unsafe conditions.

The control system 101 determines when weather or changing conditions exist (act 506). If the road condition is acceptable then the route that was previously calculated and determined based on the vehicle operator's preferences is selected and presented to the vehicle operator (act 507). The operator may be informed through audio electronics or through a display.

Where road conditions may make travel difficult along the route, the navigation system 103 may present an alternative route (act 508). The alternative route may not be an optimal route. In some cases, data indicating that the primary route is closed because of weather conditions or future weather conditions may be displayed. Other unsafe road or regional conditions such as the existence of black ice or bad visibility may be identified by a penalty score. During route planning, the score may affect route selection. A more desirable route, avoiding the bad weather conditions, may be presented to the driver (act 507).

Alternatively, the original route and the alternate route may be presented to the driver, along with the forecasted and current weather conditions, so that the driver may select between the alternatives. Instead of calculating an optimized route (act 508), the control system may calculate an estimated travel time, taking the weather conditions into account in the route selection. Once a route is selected and weather conditions worsen along the route, the route may be presented to the driver with updated information reflecting changes in travel parameters such as an increase in the estimated travel time. Additionally, corresponding weather conditions providing for the increased travel time may be presented to the vehicle operator.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A system on a vehicle for providing a weather condition comprising:
   a sensor configured to measure an ambient parameter;
   a receiver that receives a value of the ambient parameter from the sensor and receives a position parameter of the vehicle identifying a position of the vehicle, where the ambient parameter and the position parameter are combined as the weather data; and
   an initiator that initiates the transmission of the weather data to an external server from the receiver, where the external server receives meteorological data from a meteorological station that is combined with the weather data to determine the weather condition at the position of the vehicle.

2. The system of claim 1, further comprising a triggering device that sends a triggering signal to the sensor to measure the value of the ambient parameter.

3. The system of claim 2, where the triggering device is configured to provide the triggering signal at regular time intervals.

4. The system of claim 3, where the triggering device is a clock.

5. The system of claim 1, where the meteorological station comprises a Doppler radar station or a satellite station.

6. The system of claim 1, where the external receiver receives weather data from a plurality of vehicles, where the weather data from the plurality of vehicles is combined with the meteorological data to establish the weather condition.

7. The system of claim 1, where the receiver is configured to receive the position parameter of the vehicle from the sensor.

8. The system of claim 7, where the position parameter is received from a navigation system.

9. The system of claim 7, where the initiator is configured to automatically initiate a transmission of the position parameter to the external server.

10. The system of claim 1, where the initiator is configured to initiate the transmission via a wireless data link.

11. The system of claim 1, where the vehicle is a car, a truck, a train, a bus, a recreational vehicle or a boat.

12. The system of claim 1, where the meteorological data received by the external server comprises a local area weather forecast, the local area being approximately an immediate area surrounding the position of the vehicle.

13. The system of claim 12, where the local weather forecast is used to calculate a route of travel.

14. The system of claim 1, further comprising a navigation system configured to determine the position parameter.

15. The system of claim 1, where the sensor is selected from a group comprising a thermometer, a barometer, a precipitation sensor, a brightness sensor, a slip sensor, a sight range sensor, a wind sensor, and a weather radar unit.

16. A control system on a vehicle comprising:
receiving means configured to receive a value from a sensor associated with an ambient parameter;
navigating means configured to determine a position of the vehicle;
combining means configured to combine the value of the ambient parameter from the sensor with the position of the vehicle into a combined parameter value; and
initiating means configured to initiate a transmission of the combined parameter value to an external server, where the value is combined with meteorological data from a meteorological station at the external server, the external server determining a current weather condition at the position of the vehicle based on the combined parameter value and the meteorological data for that position, where the meteorological data is a weather forecast for a local area, the local area being the immediate surroundings of the approximate position of the vehicle.

17. The control system of claim 16, further comprising triggering means configured to provide a triggering signal to the sensor to measure a value of the ambient parameter.

18. The control system of claim 17, where triggering means is configured to provide the triggering signal on a regular time interval.

19. The control system of claim 17, where triggering means is configured to provide the triggering signal upon receipt of an external triggering signal.

20. The control system of claim 16, where the navigating means determines the position of the vehicle with a Global Position System ("GPS") receiver.

21. The control system of claim 16, where the ambient parameter comprises at least one of temperature, pressure, humidity, precipitation, wind visibility, brightness, fog, traction, or sunlight.

22. The control system of claim 16, where initiating means is configured to initiate the transmission via a wireless data link.

23. A method for providing weather condition, comprising:
receiving a first value of an ambient parameter associated with a sensor on a first vehicle, where the first value includes a position of the first vehicle;
receiving a second value of an ambient parameter at the position of the first vehicle from a weather provider;
receiving meteorological data from a weather provider;
combining the first value, the second value, and the meteorological data into a weather condition at the position; and
initiating the transmission of the weather condition to a second vehicle when the second vehicle is located at approximately the position.

24. The method of claim 23, further comprising receiving a third value of an ambient parameter at the position by a second vehicle, where the weather condition at the position is a combination of the third value with the first value and the second value.

25. The method of claim 24, where the position of the first vehicle is determined by a navigation system.

26. The method of claim 23, where the second value from the weather provider is meteorological data and the weather provider provides a local area weather forecast.

27. The method of claim 23, where determining the position is performed by an external positioning device on the first vehicle.

28. The method of claim 23, where the first value is a combination of the value of the ambient parameter with the position of the vehicle into one message signal for transmission.

29. The method of claim 23, further comprising correlating the value of the ambient parameter with the position of the vehicle into the first value.

30. The method of claim 23, where initiating the transmission to the server occurs through a wireless network.

31. The method of claim 30, where the wireless network comprises a telephone network.

32. The method of claim 23, further comprising triggering the sensor to measure the values of the ambient parameter, where the triggering is performed at a regular time interval.

33. The method of claim 23, where the weather provider is a one of a meteorological station or a weather satellite.

34. The method of claim 23, where the ambient parameter comprises at least one of temperature, pressure, humidity, precipitation, wind visibility, brightness, fog, traction, or sunlight.

35. The method of claim 34, further comprising calculating a route of travel between an origin and a destination based upon the weather condition.

36. A system for transmitting weather parameters comprising:
an external server;
a plurality of vehicles coupled with the external server, where each of the plurality of vehicles comprises:
a weather sensor for measuring a weather parameter;
a position sensor for measuring a position value;
a receiver coupled with the weather sensor and the position sensor, the receiver configured to receive the weather parameter and the position value;

an initiator coupled with the receiver and configured to transmit the weather parameter and the position value as a single signal to the external server;

where the external server is configured to combine the single signal from the plurality of vehicles with weather data from a weather provider to determine a weather condition for a position;

further where the external server is configured to provide the weather condition to at least one of the plurality of vehicles based on a current position of the at least one of the plurality of vehicles.

* * * * *

UNITED STATES PATENT AND TRADEMARK OFFICE
CERTIFICATE OF CORRECTION

| | |
|---|---|
| PATENT NO. | : 7,406,382 B2 |
| APPLICATION NO. | : 11/061859 |
| DATED | : July 29, 2008 |
| INVENTOR(S) | : Christian Brulle-Drews |

Page 1 of 1

It is certified that error appears in the above-identified patent and that said Letters Patent is hereby corrected as shown below:

On the Title Page

In column 1, item (30), delete "04003872" and substitute --04003872.1-- in its place.

Signed and Sealed this

Nineteenth Day of May, 2009

JOHN DOLL
*Acting Director of the United States Patent and Trademark Office*